(12) United States Patent
Yamaguchi

(10) Patent No.: US 9,448,528 B2
(45) Date of Patent: Sep. 20, 2016

(54) IMAGE-FORMING APPARATUS HAVING STRUCTURE FOR STABLY SUPPORTING BELT UNIT

(71) Applicant: Brother Kogyo Kabushiki Kaisha, Nagoya-shi, Aichi-ken (JP)

(72) Inventor: Wataru Yamaguchi, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/750,255

(22) Filed: Jun. 25, 2015

(65) Prior Publication Data

US 2016/0004210 A1    Jan. 7, 2016

(30) Foreign Application Priority Data

Jul. 1, 2014 (JP) ................................. 2014-135639

(51) Int. Cl.
G03G 15/16 (2006.01)
G03G 21/16 (2006.01)
B65G 23/04 (2006.01)

(52) U.S. Cl.
CPC ........... *G03G 21/1671* (2013.01); *B65G 23/04* (2013.01); *G03G 15/1665* (2013.01); *G03G 21/1647* (2013.01); *G03G 15/161* (2013.01); *G03G 15/1605* (2013.01); *G03G 21/16* (2013.01); *G03G 2215/0119* (2013.01); *G03G 2215/0141* (2013.01); *G03G 2221/1642* (2013.01)

(58) Field of Classification Search
CPC ..................................................... G03G 21/16
USPC ................................................... 399/101, 121
See application file for complete search history.

(56) References Cited

U.S. PATENT DOCUMENTS

| | | | |
|---|---|---|---|
| 7,903,997 | B2 | 3/2011 | Jung et al. |
| 8,401,429 | B2 | 3/2013 | Murayama |
| 8,532,528 | B2 | 9/2013 | Kawashima et al. |
| 9,042,780 | B2 | 5/2015 | Ando et al. |

(Continued)

FOREIGN PATENT DOCUMENTS

| | | | |
|---|---|---|---|
| JP | H10-91053 A | 4/1998 | |
| JP | 2001-305882 | * 11/2001 | ............... F16C 13/00 |

(Continued)

OTHER PUBLICATIONS

Co-pending U.S. Appl. No. 14/868,932, filed Sep. 29, 2015.

(Continued)

*Primary Examiner* — Clayton E LaBalle
*Assistant Examiner* — Kevin Butler
(74) *Attorney, Agent, or Firm* — Banner & Witcoff, Ltd.

(57) ABSTRACT

An image-forming apparatus includes a main body, a belt unit detachably attachable to the main body, a coupling and a first restricting part. The belt unit includes: a first roller defining an axis extending in an axial direction, a second roller opposing the first roller in a first direction perpendicular to the axial direction, and a belt looped over the first roller and the second roller. The coupling is configured to move in the axial direction to come into engagement with the first roller for inputting a drive force into the first roller. The first restricting part is provided on the main body and is configured to restrict the first roller from moving in a second direction perpendicular to the axial direction and the first direction when the belt unit is attached to the main body.

20 Claims, 11 Drawing Sheets

(56) References Cited

U.S. PATENT DOCUMENTS

| | | |
|---|---|---|
| 2007/0048005 A1 | 3/2007 | Nakano et al. |
| 2008/0134824 A1 | 6/2008 | Jung et al. |
| 2008/0138112 A1* | 6/2008 | Nakashima ........ G03G 15/1605 399/121 |
| 2009/0129814 A1* | 5/2009 | Okaji ................ G03G 21/1604 399/121 |
| 2010/0189462 A1 | 7/2010 | Kawashima et al. |
| 2011/0076051 A1* | 3/2011 | Murayama .......... G03G 15/161 399/101 |
| 2011/0200355 A1* | 8/2011 | Mori .................. G03G 15/1685 399/110 |
| 2012/0213548 A1 | 8/2012 | Kawashima et al. |
| 2013/0084099 A1 | 4/2013 | Hashimoto et al. |
| 2014/0023394 A1 | 1/2014 | Kawashima et al. |
| 2014/0099142 A1 | 4/2014 | Ando et al. |
| 2014/0186073 A1* | 7/2014 | Ju ...................... G03G 21/1623 399/121 |
| 2015/0160602 A1 | 6/2015 | Kawashima et al. |
| 2015/0274457 A1* | 10/2015 | Yamaguchi ............ B65H 23/02 198/807 |

FOREIGN PATENT DOCUMENTS

| | | | |
|---|---|---|---|
| JP | 2001-305882 A | | 11/2001 |
| JP | 2002-182537 A | | 6/2002 |
| JP | 2005-043387 A | | 2/2005 |
| JP | 2007-057952 A | | 3/2007 |
| JP | 2011-075618 A | | 4/2011 |
| JP | 2012-068684 A | | 4/2012 |
| JP | 2013-076860 A | | 4/2013 |
| JP | 2014-077866 | * | 5/2014 ............ G03G 21/16 |
| JP | 2014-077866 A | | 5/2014 |

OTHER PUBLICATIONS

Mar. 14, 2016—Non-Final Office Action—U.S. Appl. No. 14/868,932.

* cited by examiner

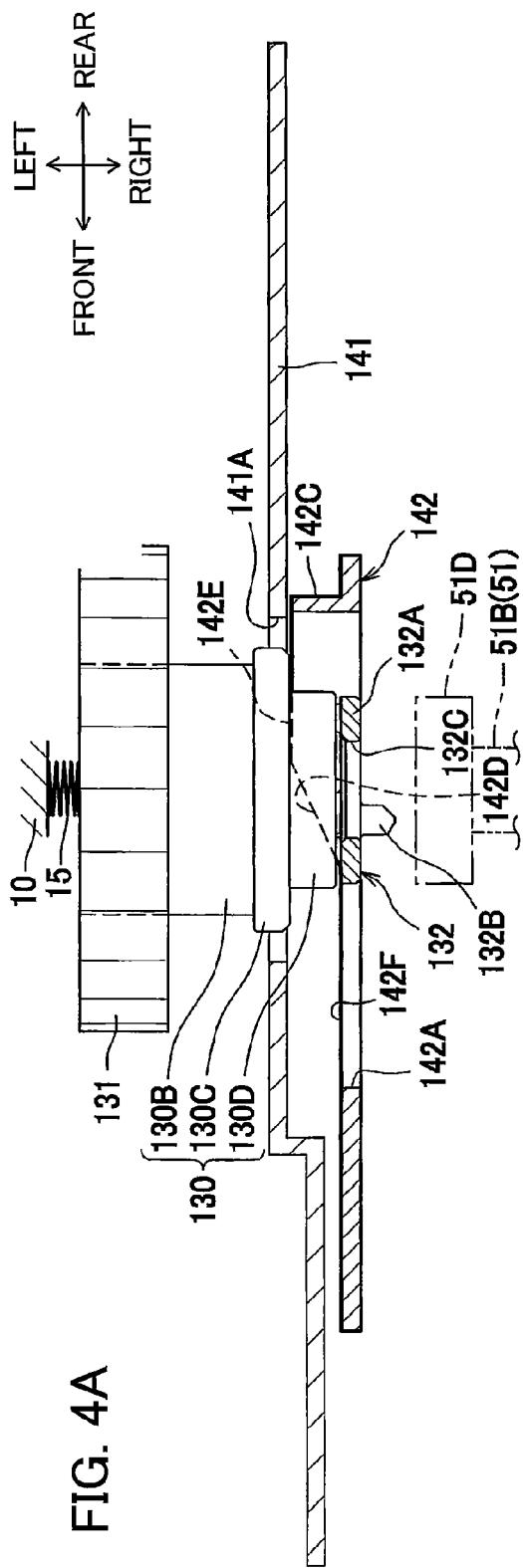

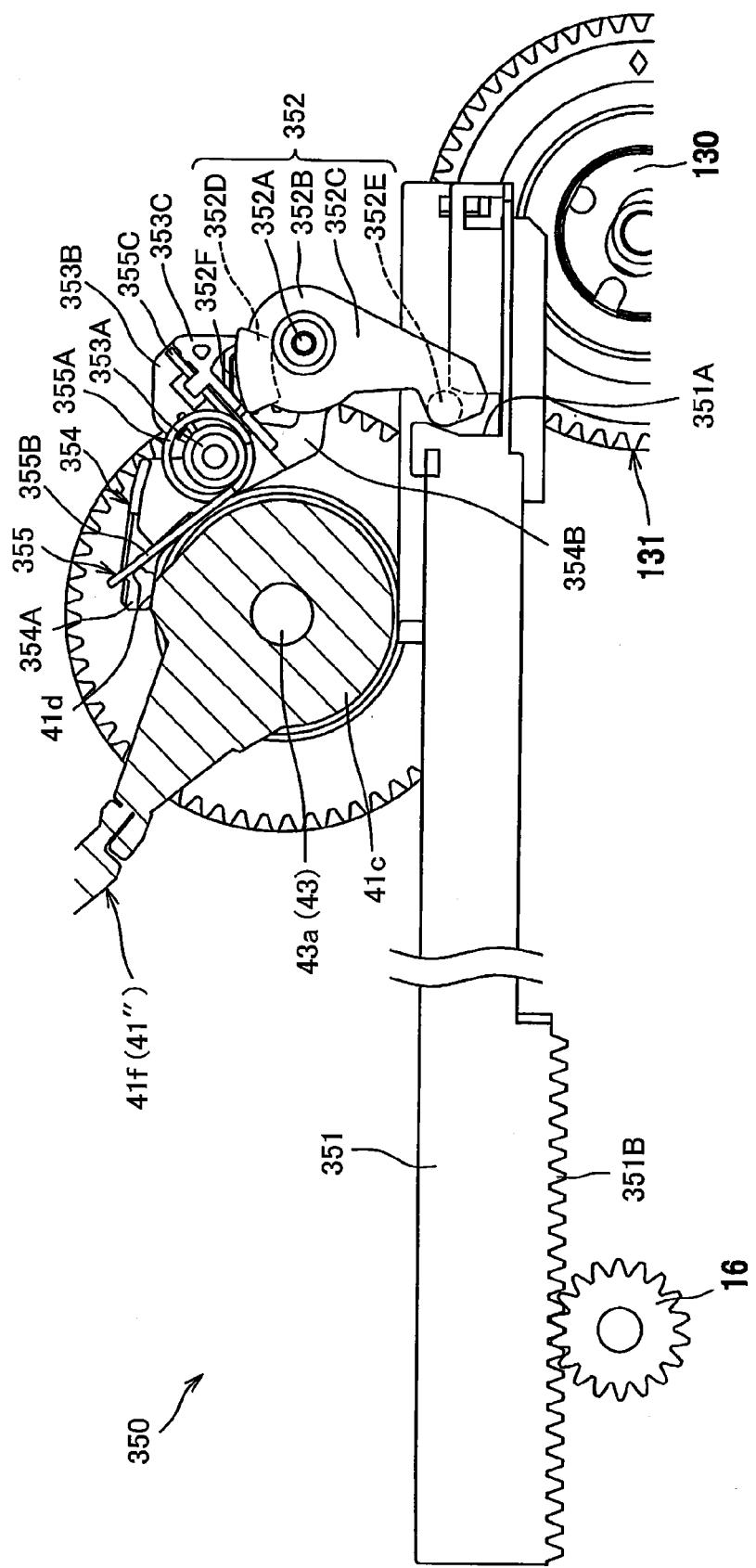

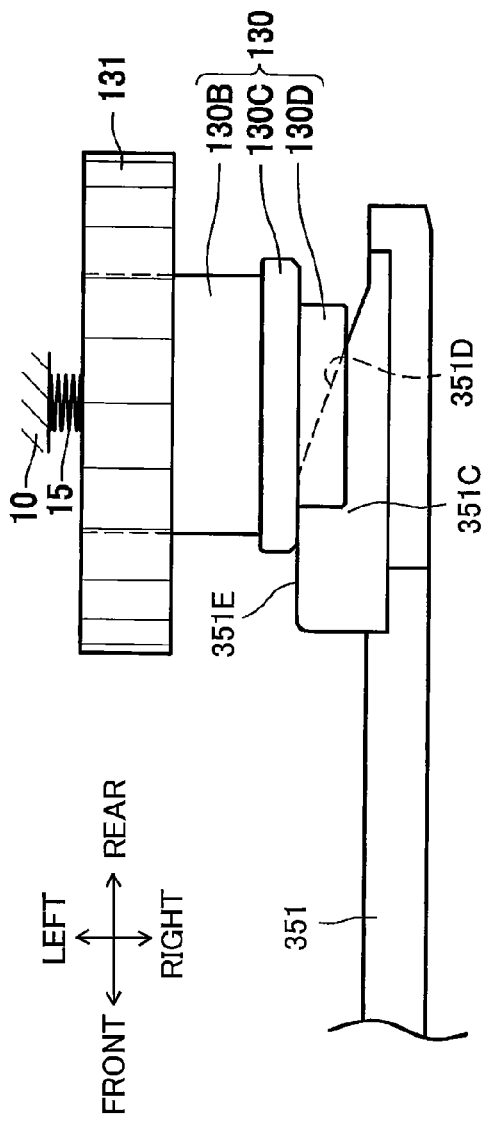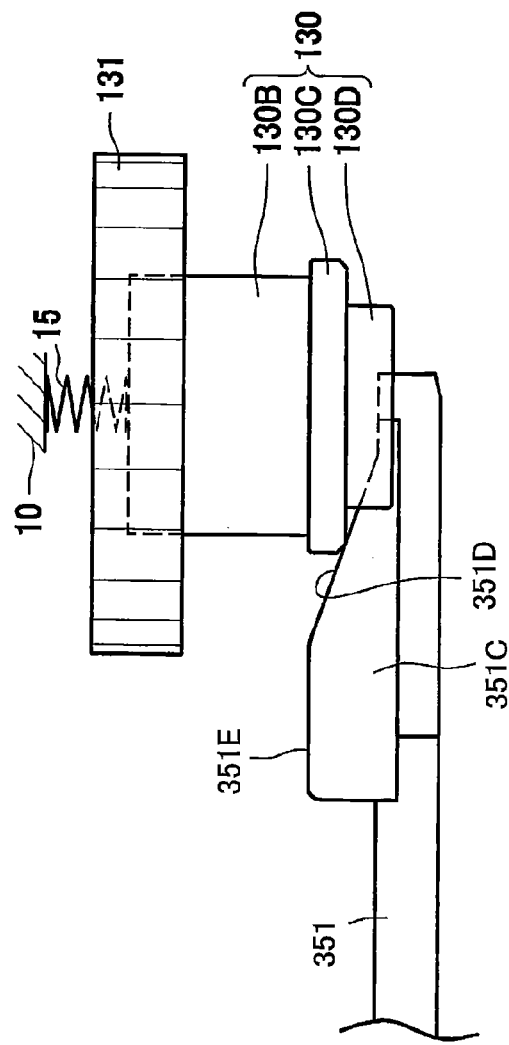

REAR ←——→ FRONT

IMAGE-FORMING APPARATUS HAVING STRUCTURE FOR STABLY SUPPORTING BELT UNIT

CROSS REFERENCE TO RELATED APPLICATION

This application claims priority from Japanese Patent Application No. 2014-135639 filed Jul. 1, 2014. The entire content of the priority application is incorporated herein by reference.

TECHNICAL FIELD

The present disclosure relates to an image forming apparatus provided with a belt unit that is detachably mountable in a main body of the image forming apparatus.

BACKGROUND

In one conventional image-forming apparatus provided with a belt unit that is detachably mountable in a main body of the image-forming apparatus, the belt unit includes a belt, and a drive roller and a follow roller over which the belt is mounted in a taut state (for example, please refer to Japanese Patent Application Publication No. 2011-075618). The main body of this image-forming apparatus is provided with a position-fixing part for fixing the position of the belt unit, and a belt drive gear that inputs a drive force into a drive roller gear provided on the drive roller. This drive force serves to press the belt unit against the position-fixing part.

However, changing the distance between the axes of the belt drive gear and the drive roller gear tends to change the conveying speed of the belt. In order to suppress such fluctuations in the conveying speed of the belt, a construction employing a coupling was conceived, whereby the coupling engages the drive roller in its axial direction and inputs a drive force into the drive roller. However, since the drive force inputted by the coupling does not generate a force for pressing the belt unit against the position-fixing part, as does the drive force of the belt drive gear, any disturbance or the like that changes the vertical position of the belt unit could cause the behavior of the belt to become unstable.

SUMMARY

In view of the foregoing, it is an object of the disclosure to provide an image-forming apparatus capable of ensuring a stable behavior of a belt.

In order to attain the above and other objects, the disclosure provides an image-forming apparatus that may include: a main body; a belt unit attachable to the main body; a coupling; and a first restricting part. The belt unit may include a belt, a first roller and a second roller. The first roller defines an axis extending in an axial direction and is configured to rotate about the axis. The second roller opposes the first roller in a first direction perpendicular to the axial direction. The belt is looped over the first roller and the second roller and extends in the first direction. The coupling is configured to move in the axial direction to come into engagement with the first roller for inputting a drive force into the first roller. The first restricting part is provided on the main body and is configured to restrict the first roller from moving in a second direction perpendicular to the axial direction and the first direction when the belt unit is attached to the main body.

BRIEF DESCRIPTION OF THE DRAWINGS

The particular features and advantages of the disclosure as well as other objects will become apparent from the following description taken in connection with the accompanying drawings, in which:

FIG. 4A is a cross-sectional view taken along a plane AI-AI shown in FIG. 3A;

FIG. 4B is a cross-sectional view taken along a plane AII-AII shown in FIG. 3B;

FIG. 9 is an explanatory view illustrating a structure of the interlocking mechanism according to the third embodiment, wherein the process unit according to the third embodiment is in a locked state;

FIG. 10A is a bottom side view of a coupling configured to be engaged with a drum locking rod constituting the interlocking mechanism according to the third embodiment in a state shown in FIG. 8;

FIG. 10B is a bottom side view of the coupling configured to be engaged with the drum locking rod constituting the interlocking mechanism according to the third embodiment in a state shown in FIG. 9;

DETAILED DESCRIPTION

1. First Embodiment

A color printer 1 according to a first embodiment will be described while referring to FIGS. 1 through 5C.

Directions in the following description will be based on an orientation of the color printer 1 shown in FIG. 1. Specifically, the right side of the color printer 1 in FIG. 1 will be called the "front," the left side will be called the "rear," the near side will be called the "left," and the far side will be called the "right." Further, the "top" and "bottom" of the color printer 1 will correspond to the vertical direction in FIG. 1.

Figure 1:
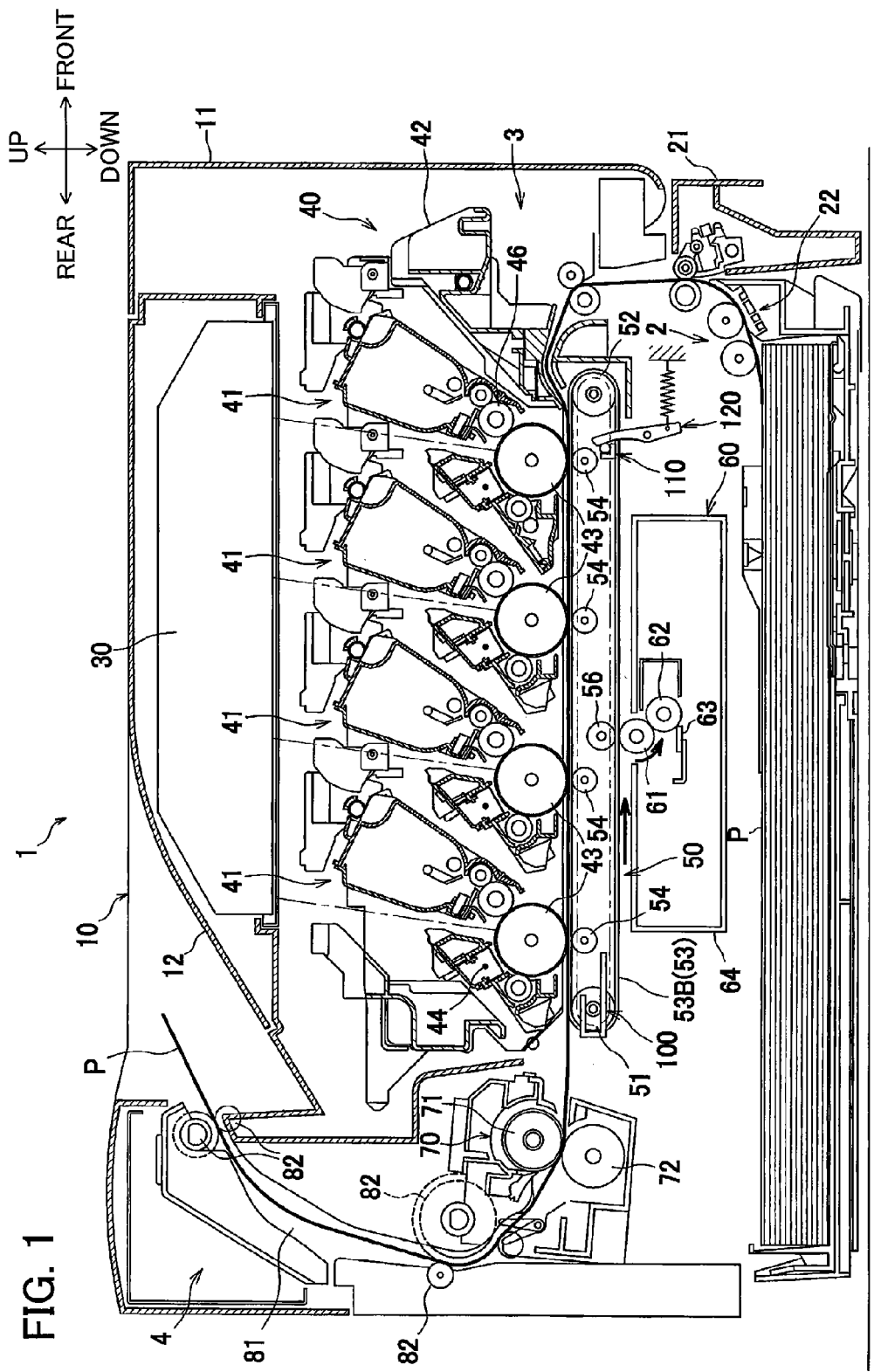
FIG. 1 is a cross-sectional view showing a general construction of a color printer according to a first embodiment, the color printer having a belt unit.

As shown in FIG. 1, the color printer 1 includes a main body 10. Within the main body 10, primarily provided are a sheet-feeding section 2 for supplying sheets P of paper to be printed, an image-forming section 3 for forming images on the sheets P supplied by the sheet-feeding section 2, and a paper-discharging section 4 for discharging sheets P from the main body 10 after the image-forming section 3 has formed an image thereon.

The sheet-feeding section 2 is provided in a bottom portion of the main body 10. The sheet-feeding section 2 primarily includes a paper tray 21 configured to accommodate sheets P of paper, and a sheet-feeding mechanism 22 for supplying the sheets P from the paper tray 21 to the image-forming section 3. The sheet-feeding mechanism 22 is configured to separate the sheets P in the paper tray 21 and supply the sheets P one at a time to the image-forming section 3.

The image-forming section 3 primarily includes an exposure unit 30, an image-forming unit 40, a belt unit 50, a belt cleaner 60, and a fixing unit 70.

The exposure unit 30 is provided in an upper portion of the main body 10. Although not shown in the drawings, the exposure unit 30 includes a laser light-emitting unit, a polygon mirror, lenses, reflecting mirrors, and the like.

The image-forming unit 40 is arranged between the sheet-feeding section 2 and the exposure unit 30. The image-forming unit 40 primarily includes four process units 41, and a retaining member 42 for retaining the four process units 41 at positions juxtaposed in the front-rear direction. The retaining member 42 can be moved between a mounted position inside the main body 10 (the position shown in FIGS. 1 and 3B) and a removed position displaced from the mounted position (the position shown in FIG. 3A, for example).

Each process unit 41 includes a photosensitive drum 43 (as an example of a photosensitive member), a charger 44, and a developing roller 46, as well as a supply roller, a thickness-regulating blade, and a toner-accommodating portion for which reference numerals have been omitted.

The belt unit 50 is provided between the sheet-feeding section 2 and the image-forming unit 40. The belt unit 50 can be mounted in and removed from the main body 10. The belt unit 50 primarily includes a drive roller 51 (as an example of a first roller), a follow roller 52 (as an example of a second roller), an endless conveying belt 53 mounted over the drive roller 51 and follow roller 52 in a taut state, and four transfer rollers 54.

Figure 2:
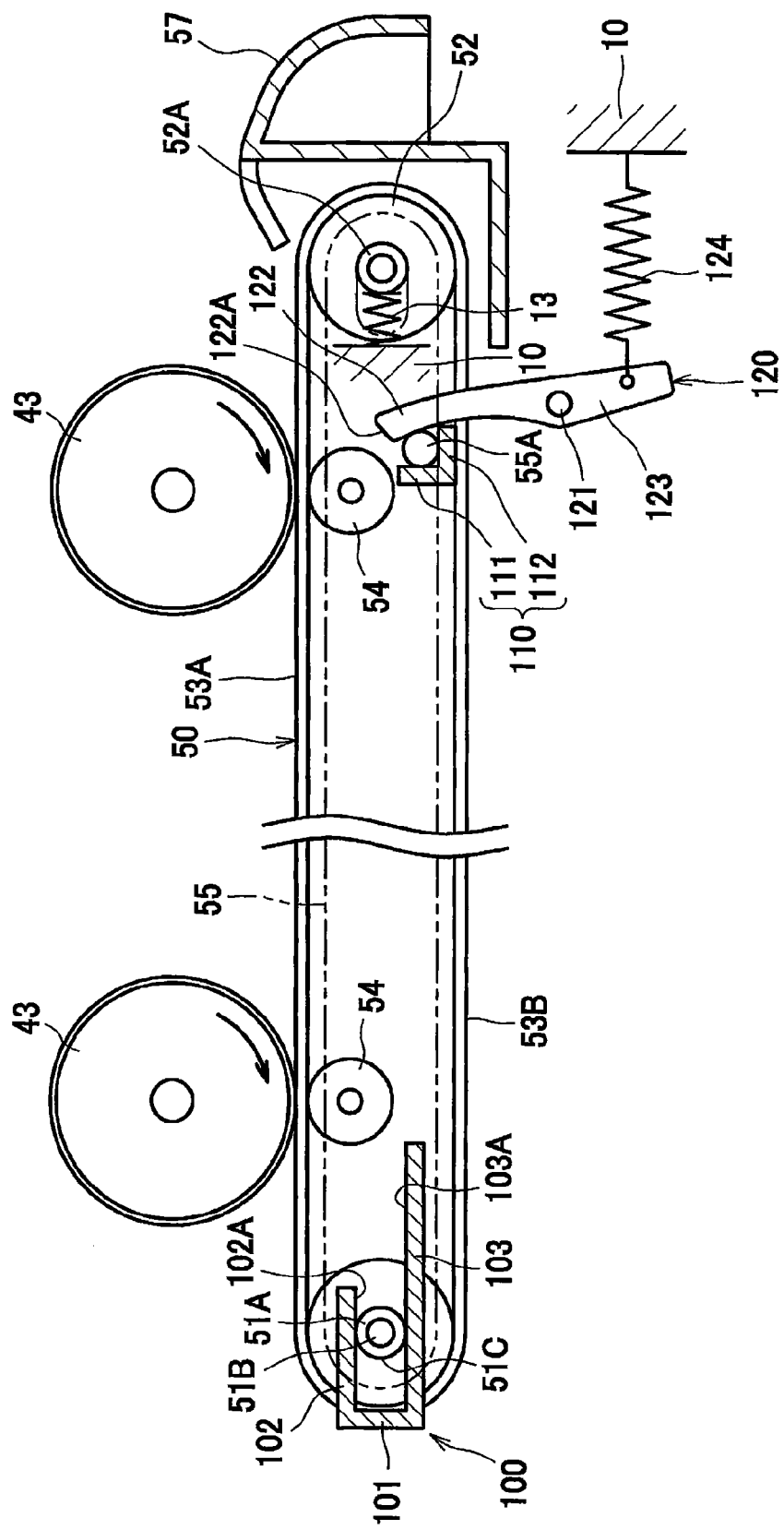
FIG. 2 is a partially enlarged explanatory view showing structures near the belt unit according to the first embodiment.

As shown in FIG. 2, the conveying belt 53 (as an example of a belt) is stretched over the drive roller 51 and follow roller 52 in the front-rear direction (as an example of a first direction). The conveying belt 53 has a top surface 53A, and a bottom surface 53B. The top surface 53A extends in the front-rear direction and contacts each of the photosensitive drums 43. The bottom surface 53B also extends in the front-rear direction and contacts a cleaning roller 61 of the belt cleaner 60 described later. The transfer rollers 54 are arranged on the inside of the loop formed by the conveying belt 53 at positions for pinching the conveying belt 53 against corresponding photosensitive drums 43.

As shown in FIG. 1, the belt cleaner 60 is disposed beneath the belt unit 50. The belt cleaner 60 includes the cleaning roller 61, a recovery roller 62, a blade 63, and a waste box 64. As described above, the cleaning roller 61 is in contact with the bottom surface 53B of the conveying belt 53 and is configured to rotate so as to move in a direction opposite that the bottom surface 53B moves. A backup roller 56 is disposed inside the loop defined by the conveying belt 53 at a position for confronting the cleaning roller 61.

The fixing unit 70 is disposed to the rear of the image-forming unit 40 and belt unit 50. The fixing unit 70 includes a heating roller 71, and a pressure roller 72 disposed in confrontation with the heating roller 71 and contacting the heating roller 71 with pressure.

In an image-forming operation of the image-forming section 3, the charger 44 applies a uniform charge to the surface of the photosensitive drum 43, after which the exposure unit 30 irradiates laser beams (indicated by chain lines in FIG. 1) in a high-speed scan to expose the surfaces of corresponding photosensitive drums 43 and form electrostatic latent images thereon. The supply rollers of the process units 41 then supply toner from the corresponding toner-accommodating portions to the corresponding developing rollers 46, and the toner on the surfaces of the developing rollers 46 is maintained at a uniform thickness by the corresponding thickness-regulating blades.

The toner carried on the surfaces of the developing rollers 46 is then supplied to the electrostatic latent images formed on the corresponding photosensitive drums 43 to produce toner images on the photosensitive drums 43. Thereafter, a sheet P supplied onto the conveying belt 53 is conveyed between the photosensitive drums 43 and conveying belt 53 (transfer rollers 54), whereby the toner images formed on the photosensitive drums 43 are respectively transferred to and superposed on the sheet P. After the toner image has been transferred onto the sheet P, the sheet P is conveyed between the heating roller 71 and pressure roller 72 of the fixing unit 70 to thermally fix the toner image to the sheet P.

The paper-discharging section 4 includes a discharge path 81 that extends upward from the exit point of the fixing unit 70 and subsequently frontward, and a plurality of conveying rollers 82 for conveying the sheets P. After a toner image is thermally fixed to a sheet P in the fixing unit 70, the conveying rollers 82 convey the sheet P along the discharge path 81 and discharge the sheet P onto a discharge tray 12 provided on the top of the main body 10.

A front cover 11 is provided on a front end portion of the main body 10 and serves as a front wall that can be opened and closed. When the front cover 11 is open, an operator can pull the retaining member 42 out from the main body 10 to the removed position in order to remove the process units 41. By removing the retaining member 42 from the main body 10, the operator can also remove the belt unit 50 from the main body 10.

Next, a detailed structure near the belt unit 50 will be described.

As shown in FIG. 2, the belt unit 50 includes a frame 55 that supports the drive roller 51, follow roller 52, and conveying belt 53 described above.

The frame 55 rotatably supports the drive roller 51 through bearings 51A serving as examples of a first restricted part. The drive roller 51 has a shaft 51B that protrudes outward (rightward and leftward) in the left-right direction from the frame 55. Each of the bearings 51A has an outer circumferential surface 51C as an example of a cylindrical surface that has a circular shape concentric with the drive roller 51. That is, each bearing 51A defines an axial center coincident with the axis of the drive roller 51 (axis of the shaft 51B of the drive roller 51).

The frame 55 rotatably supports the follow roller 52 through bearings 52A such that the follow roller 52 can move in the front-rear direction. Compressed springs 13 provided in the main body 10 urge the follow roller 52 forward so that the follow roller 52 can be moved away from the drive roller 51 to apply a suitable tension to the conveying belt 53.

Pins 55A as examples of a second restricted part and a third restricted part are provided on the belt unit 50 so as to protrude outward in respective left and right directions. The pins 55A are positioned closer to the follow roller 52 side of the frame 55 than the drive roller 51 side.

A handle 57 is provided on the belt unit 50, and specifically is fixed to a front end portion of the frame 55. The user can grip the handle 57 when mounting the belt unit 50 in and removing the belt unit 50 from the main body 10.

Provided in the main body 10 are a first restricting member 100 as an example of a first restricting part, a pair of (left and right) second restricting members 110, and a pair of (left and right) pressing members 120 as examples of a first pressing member and a second pressing member.

The first restricting member 100 is provided on the left side of the drive roller 51 of the belt unit 50 mounted in the main body 10. The first restricting member 100 is configured to restrict the position of the drive roller 51 vertically through the bearing 51A of the drive roller 51. This vertical direction is an example of a second direction that is orthogonal to both the left-right and front-rear directions.

The first restricting member 100 has a base part 101 that is elongated vertically, an upper part 102 that extends forward from a top edge of the base part 101, and a lower part 103 that extends forward from a bottom edge of the base part 101. The lower part 103 extends much farther forward than the upper part 102. The first restricting member 100 is open on the front side.

The upper part 102 and lower part 103 define a gap therebetween slightly larger than the outer diameter of the bearing 51A so as to fit around the outer circumferential surface 51C of the bearing 51A. By fitting the bearing 51A between the upper part 102 and lower part 103, the outer circumferential surface 51C of the bearing 51A can contact a bottom surface 102A of the upper part 102 and a top surface 103A of the lower part 103. Thus, the bottom surface 102A of the upper part 102 and the top surface 103A of the lower part 103 oppose each other with the axis of the drive roller 51 interposed therebetween. The bottom surface 102A and top surface 103A are examples of a pair of restricting surfaces.

The second restricting members 110 are positioned to be spaced away from the first restricting member 100 in the front-rear direction. The second restricting members 110 are configured to restrict movement of the belt unit 50 in both front-rear direction and vertical direction. The second restricting members 110 are disposed closer to the follow roller 52 of the belt unit 50 than to the drive roller 51 in the front-rear direction. Each second restricting member 110 integrally includes a rear restricting part 111 as an example of a second restricted part, and a bottom restricting part 112 as an example of a third restricted part.

The rear restricting part 111 is elongated vertically and positioned to contact a rear surface of the corresponding pin 55A. The bottom restricting part 112 extends forward from a bottom edge of the corresponding rear restricting part 111 and is positioned to contact a bottom surface of the corresponding pin 55A.

The pressing members 120 are provided in front of the corresponding pins 55A and are capable of pivoting about respective pivot shafts 121. Each pressing member 120 includes a first arm 122 extending upward from the pivot shaft 121, and a second arm 123 extending downward from the pivot shaft 121.

The first arm 122 is configured to contact an upper front portion of the corresponding pin 55A in order to press the pin 55A in a direction diagonally downward and rearward. The second arm 123 has a bottom end that is engaged with one end of a spring 124.

The other end of the spring 124 is engaged with the main body 10. The spring 124 constantly urges the second arm 123 forward. Consequently, the first arm 122 is constantly urged rearward by the spring 124. With this configuration, the pressing member 120 presses the corresponding pin 55A toward the second restricting member 110, and specifically toward the rear restricting part 111 and bottom restricting part 112.

The first arm 122 has a top endface 122A that slopes downward toward the rear. When mounting the belt unit 50 in the main body 10, the pins 55A coming downward contact the top endfaces 122A of the first arms 122, causing the first arms 122 to move forward out of the path of the pins 55A.

Figure 3A:
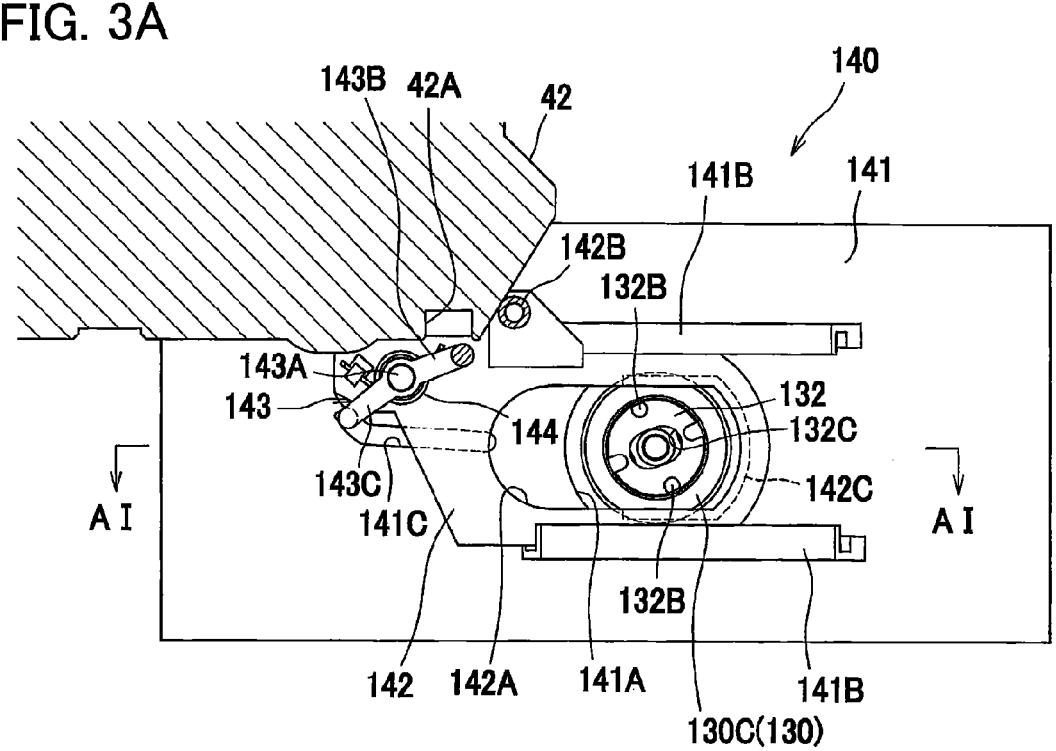
FIG. 3A is an explanatory view illustrating movement of an interlocking mechanism according to the first embodiment, wherein a retaining member is at a removed position.

Further, as shown in FIGS. 3A and 4A, a coupling 130 is provided in the main body 10 for inputting a drive force into the drive roller 51. The coupling 130 is provided leftward of the drive roller 51 and is capable of engaging the shaft 51B of the drive roller 51 from the left side.

As shown in FIG. 4A, an output-side coupling 51D is provided on a left end of the shaft 51B in the drive roller 51. The coupling 130 is capable of advancing toward the output-side coupling 51D and retracting from the output-side coupling 51D in the left-right direction. Specifically, the coupling 130 can move between a retracted position (the position shown in FIG. 4A) separated from the output-side coupling 51D and a connected position (the position shown in FIG. 4B) connected to the output-side coupling 51D.

The coupling 130 includes a shaft 130B, a flange 130C and an input part 130D. The flange 130C protrudes radially outward from a right end of the shaft 130B (the bottom end in the drawing). The input part 130D protrudes rightward (downward in the drawing) from the flange 130C.

A drive gear 131 is coaxially provided on a left end (the top end in the drawing) of the shaft 130B for receiving a drive force from a motor (not shown). The shaft 130B is inserted into the drive gear 131 and rotates together with the same. The shaft 130B can move relative to the drive gear 131 in the left-right direction. A compressed spring 15 is provided in the main body 10 for urging the shaft 130B rightward (toward the drive roller 51). The flange 130C has an annular shape and is capable of contacting a sliding member 142 described later.

The input part 130D is configured to input the drive force transmitted from the drive gear 131 into the drive roller 51 via a joint 132. The input part 130D has a smaller diameter than the shaft 130B and flange 130C.

The joint 132 functions to transmit the drive force from the drive gear 131 to the drive roller 51 via the coupling 130 while the shaft 130B of the coupling 130 (input side) is offset from the shaft 51B of the drive roller 51 (output side). The joint 132 includes an Oldham member configured to be able to transmit the drive force even when the shaft 130B and the shaft 51B are in a decentered state. More specifically, as shown in FIGS. 3A and 4A, the joint 132 includes a disc-shaped base part 132A, protruding parts 132B protruding rightward from the base part 132A, and an engaging part (not shown) that engages with the right end of the input part 130D. The protruding parts 132B are capable of engaging with the output-side coupling 51D on the shaft 51B of the drive roller 51. An elongate hole 132C extending in substantially the front-rear direction is formed in the base part 132A.

As shown in FIG. 3A, an interlocking mechanism 140 as an example of a first interlocking mechanism is provided in the main body 10. The interlocking mechanism 140 is configured to advance and retract the coupling 130 in the left-right direction in association with movement of the retaining member 42.

The interlocking mechanism 140 includes a side frame 141, a sliding member 142, and a pivot member 143. The side frame 141 is disposed on the left side of the conveying belt 53. An opening 141A is formed in the side frame 141 at a position corresponding to the coupling 130. The opening 141A has a larger diameter than the flange 130C.

A pair of sliding rails 141B is provided on the side frame 141. The sliding rails 141B are provided one above and one below the opening 141A and extend in the front-rear direction. A guiding slot 141C is formed in the side frame 141 frontward of the opening 141A and extends substantially in the front-rear direction.

The sliding member 142 has a plate shape. The sliding member 142 has top and bottom edges supported by the pair of sliding rails 141B so that the sliding member 142 can slide in the front-rear direction along the sliding rails 141B. In other words, the sliding member 142 can move between a forward position (the position shown in FIG. 3A) at which the retaining member 42 is in its removed position, and a rearward position (the position shown in FIG. 3B) at which the retaining member 42 is in its mounted position.

An elongate hole 142A is formed in the sliding member 142 at a position corresponding to the coupling 130. The elongate hole 142A is elongated in the front-rear direction and has a vertical width that is slightly smaller than the flange 130C. A first contact part 142B is provided on an upper end of the sliding member 142 at a position for contacting the front end of the retaining member 42.

As shown in FIG. 4A, a protruding wall 142C is provided to protrude leftward from a left surface 142F of the sliding member 142. The protruding wall 142C is formed along a rear half of the elongate hole 142A, i.e., along a rear half of an upper edge, a rear half of a lower edge and a rear edge of the elongate hole 142A. The protruding wall 142C is positioned to contact the upper and lower peripheral portions of the flange 130C. Specifically, the protruding wall 142C includes a pair of (upper and lower) second contact parts 142D sloping leftward toward the rear, and a pair of (upper and lower) third contact parts 142E each extending rearward from the rear edge of the corresponding second contact part 142D.

When the sliding member 142 is in its forward position (FIG. 4A), the third contact parts 142E are in contact with the flange 130C, forcing the coupling 130 leftward against the urging force of the compressed spring 15. At this time, the coupling 130 is in its retracted position.

The pivot member 143 is provided on a front end portion of the sliding member 142. The pivot member 143 includes a pivot shaft 143A, a first pivot arm 143B extending rearward from the pivot shaft 143A and a second pivot arm 143C extending frontward from the pivot shaft 143A. The pivot member 143 is configured to pivotally move about the pivot shaft 143A.

The first pivot arm 143B has a distal end that is configured to engage in a groove 42A formed in a lower rear end portion of the retaining member 42. The second pivot arm 143C has a distal end that is engaged in the guiding slot 141C. A coil spring 144 is provided on and around the pivot shaft 143A constituting the pivot member 143. The coil spring 144 urges the first pivot arm 143B clockwise in FIG. 3.

When the sliding member 142 moves rearward, the pivot member 143 is caused to pivot counterclockwise in FIG. 3A while the distal end of the second pivot arm 143C moves along the guiding slot 141C against the biasing force of the coil spring 144.

Next, operations performed with the color printer 1 having the above structure will be described.

Figure 5A:
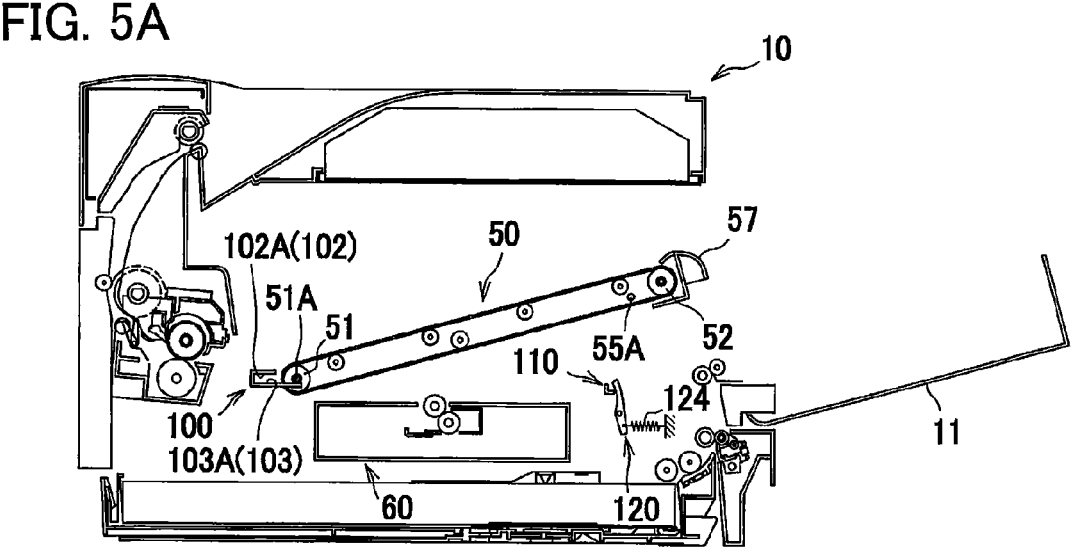
FIGS. 5A-5C are explanatory views illustrating how the belt unit according to the first embodiment is attached to a main body of the color printer.

To mount the belt unit 50 in the main body 10, the user first opens the front cover 11 and, with the retaining member 42 removed from the main body 10, inserts the belt unit 50 into the main body 10 as illustrated in FIG. 5A. At this time, the user inserts the drive roller 51 side of the belt unit 50 first into the main body 10, with the handle 57 positioned higher than the drive roller 51. The user places the bearing 51A of the drive roller 51 on top of the lower part 103 of the first restricting member 100 and slides the belt unit 50 rearward. Since the lower part 103 extend farther forward than the upper part 102, the user can easily place the bearing 51A on the lower part 103 to smoothly slide the belt unit 50 rearward along the lower part 103.

Figure 5B:
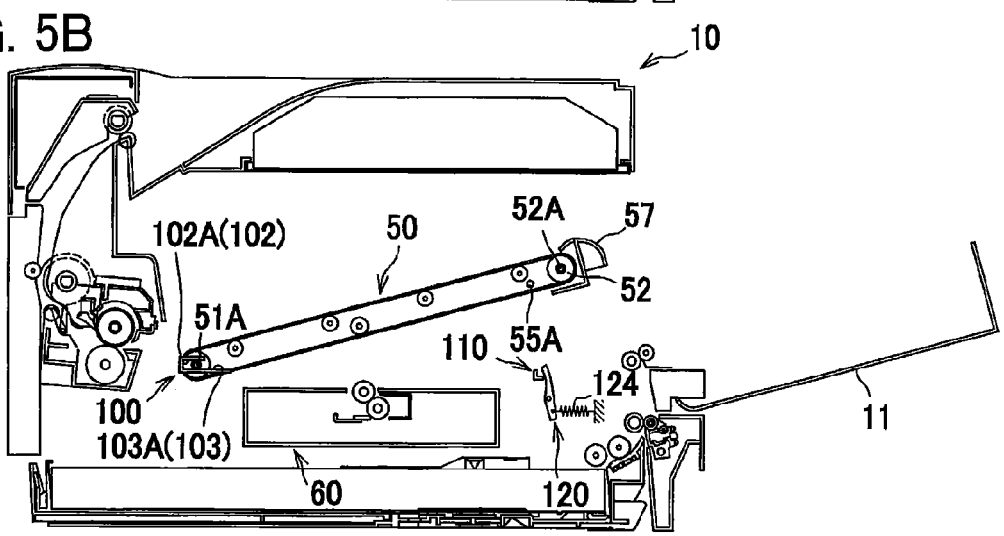

The user slides the drive roller 51 rearward until the bearing 51A is in the mounted position interposed between the upper part 102 and lower part 103, as illustrated in FIG. 5B. In this state, the vertical position of the belt unit 50 on the drive roller 51 side is restricted. Since the vertical position of the drive roller 51 is stabilized in this configuration, the behavior of the conveying belt 53 when operating is also stable.

Figure 5C:
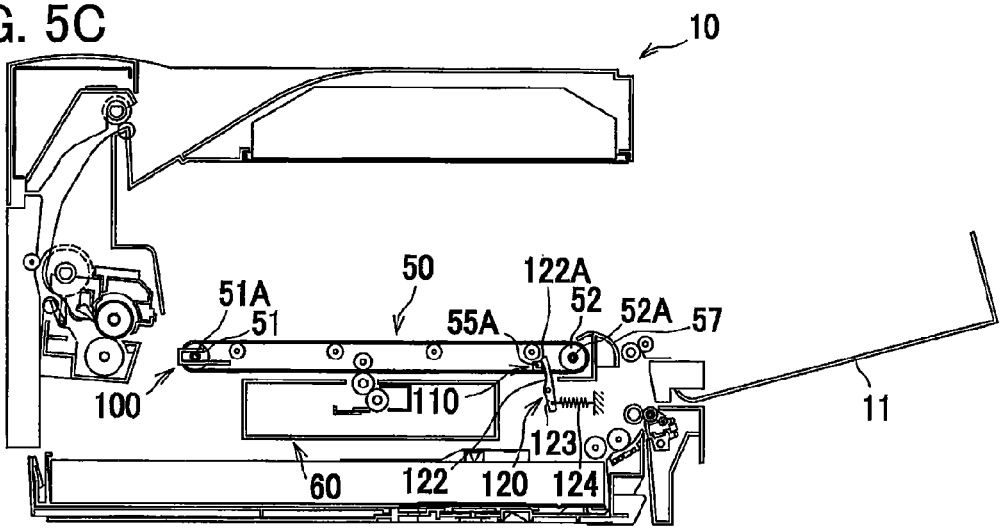

After the bearing 51A is in its mounted position, the user lowers the handle 57 and, hence, lowers the front end of the belt unit 50, as illustrated in FIG. 5C. During this operation, the belt unit 50 is pivoted downward into its mounted position about the bearing 51A interposed between the upper part 102 and lower part 103.

As the front end of the belt unit 50 is lowered, the pins 55A contact the top endfaces 122A on the corresponding first arms 122 of the pressing members 120, pushing the first arms 122 forward to place the pins 55A on top of the corresponding second restricting members 110. Once the pins 55A are positioned on the second restricting members 110 in this way, the springs 124 pulling the corresponding second arms 123 forward cause the first arms 122 to press against the corresponding pins 55A in a direction diagonally downward and rearward, thereby pressing the pins 55A against the second restricting members 110. Through this configuration, the front-rear and vertical position of the belt unit 50 are restricted on the follow roller 52 side, inhibiting the belt unit 50 from pivotally moving about the bearings 51A.

To remove the belt unit 50 from the main body 10, the user lifts the handle 57 upward and, hence, lifts the front end of the belt unit 50 upward while pivoting the belt unit 50 about the bearings 51A, as illustrated in FIG. 5B. Next, the user slides the bearings 51A forward along the lower parts 103, as illustrated in FIG. 5A and removes the belt unit 50 from the main body 10.

Figure 3B:
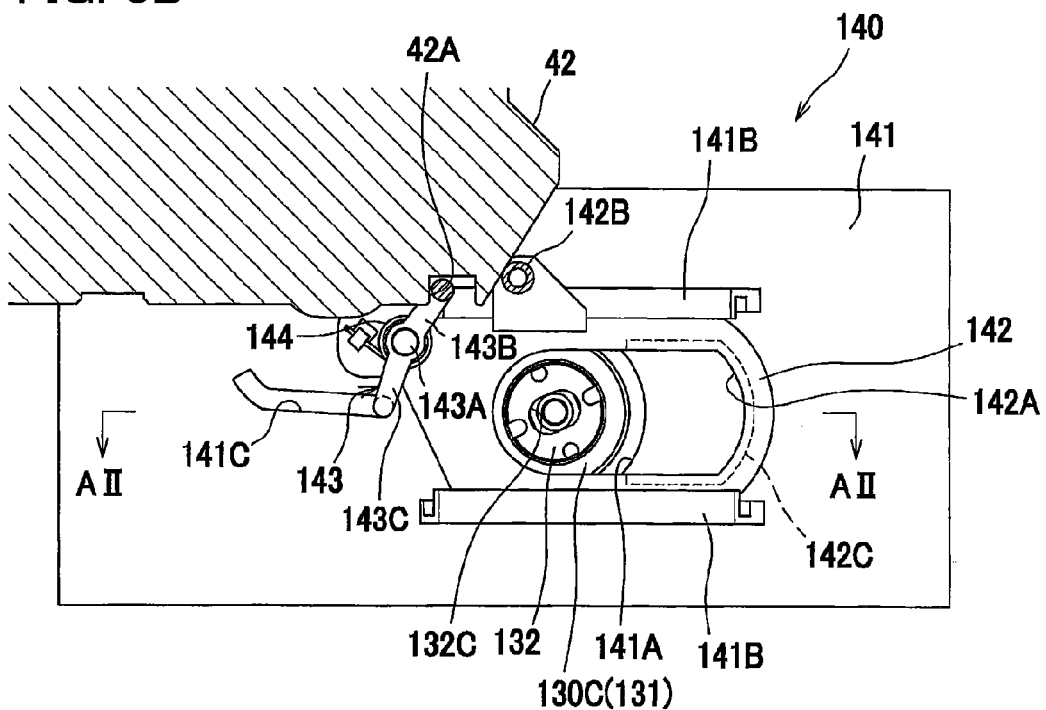
FIG. 3B is an explanatory view illustrating movement of the interlocking mechanism according to the first embodiment, wherein the retaining member is at a mounted position.

To mount the retaining member 42 in the main body 10, the user moves the sliding member 142 from its forward position to its rearward position, with the retaining member 42 abutted against the first contact part 142B, as shown in FIG. 3A. While the sliding member 142 is moving rearward, the second pivot arm 143C of the pivot member 143 moves along the guiding slot 141C. At this time, the pivot member 143 pivotally moves counterclockwise in FIG. 3A against the urging force of the coil spring 144 until the first pivot arm 143B of the pivot member 143 becomes engaged in the groove 42A, as shown in FIG. 3B. At this time, the retaining member 42 is in its mounted position, and the sliding member 142 is in its rearward position.

Further, when the sliding member 142 begins moving from its forward position toward its rearward position, the third contact parts 142E slide past the flange 130C of the coupling 130, and the flange 130C is caused to slide rightward along the second contact parts 142D due to the urging force of the compressed spring 15, as illustrated in FIG. 4A. The flange 130C thus gradually moves rightward (toward the drive roller 51) from its retracted position along the second contact parts 142D. Once the sliding member 142 moves to its rearward position shown in FIG. 4B, the flange 130C is in contact with the left surface 142F of the sliding member 142 and, hence, is disposed in its contact position. At this time, the coupling 130 is engaged with the output-side coupling 51D of the drive roller 51.

Thus, by moving the coupling 130 rightward in conjunction with the operation for mounting the retaining member 42 (photosensitive drums 43) in the main body 10, the interlocking mechanism 140 can engage the coupling 130 with the output-side coupling 51D of the drive roller 51.

To remove the retaining member 42 from the main body 10, the user moves the retaining member 42 forward from the position shown in FIG. 3B. At this time, the first pivot arm 143B engaged in the groove 42A moves forward, causing the sliding member 142 to move from its rearward position toward its forward position. Consequently, the second pivot arm 143C pivots clockwise along the guiding slot 141C, causing the first pivot arm 143B to disengage from the groove 42A, as shown in FIG. 3A. After the retaining member 42 is removed from the main body 10, the sliding member 142 is maintained in its forward position by the urging force of the coil spring 144.

Further, when the sliding member 142 begins moving from its rearward position toward its forward position, the flange 130C of the coupling 130 moves gradually leftward (toward the main body 10) from its contact position shown in FIG. 4B against the urging force of the compressed spring 15 while sliding along the second contact parts 142D. When the sliding member 142 moves to the forward position, the flange 130C contacts the third contact parts 142E, as shown in FIG. 4A, thereby arriving at its retracted position.

Hence, by moving the coupling 130 leftward in association with the operation for removing the retaining member 42 (the photosensitive drums 43) from the main body 10, the interlocking mechanism 140 can disengage the coupling 130 from the output-side coupling 51D of the drive roller 51.

With the above-described configuration of the first embodiment, the following operational and technical advantages can be achieved.

Since the first restricting member 100 restricts the vertical position of the belt unit 50 on the drive roller 51 side, any disturbances or the like are unlikely to cause fluctuations in the vertical position of the drive roller 51. Accordingly, this construction stabilizes the behavior of the conveying belt 53 while reducing any occurrence of positional fluctuation in images.

Since the bearings 51A of the drive roller 51 are interposed between the bottom surface 102A of the upper part 102 and the top surface 103A of the lower part 103, the position of the drive roller 51 does not change either up or down.

Further, since the first restricting member 100 contacts the bearing 51A when the belt unit 50 is being mounted, the belt unit 50 can be pivoted into its mounted position.

By leaving the front end of the first restricting member 100 open, the belt unit 50 can be easily mounted into the front end of the first restricting member 100.

Since the lower part 103 extends farther forward than the upper part 102, the belt unit 50 can be easily placed on the first restricting member 100 during mounting.

The second restricting members 110 can restrict the position of the belt unit 50 in both vertical and front-rear directions. Further, owing to their position toward the front end of the belt unit 50, the bottom restricting parts 112 of the second restricting members 110 can restrict the belt unit 50 from pivotally moving about the drive roller 51. Also, the pressing member 120 is applied with a smaller force from the rotational moment generated by rotation of the drive roller 51.

Further, a drive force can be made transmittable to the belt unit 50 when mounting the retaining member 42 (photosensitive drums 43), and the coupling 130 can be disengaged when removing the retaining member 42 in order to remove and replace the belt unit 50.

Further, since the cleaning roller 61 can rotate such that its point of contact with the conveying belt 53 moves (rearward) opposite the moving direction of the conveying belt 53 (forward), the belt unit 50 can easily be pushed rearward, i.e., the pins 55A can easily be pushed against the rear restricting parts 111.

Still further, the joint 132 (with an Oldham coupling structure) is disposed between the coupling 130 and the shaft 51B of the drive roller 51. Hence, positional offset between the shaft 130B of the coupling 130 and the shaft 51B of the drive roller 51 is allowable when mounting the belt unit 50.

2. Second Embodiment

A color printer 201 according to a second embodiment will be described while referring to FIGS. 6 through 7B, wherein like parts and components are designated by the same reference numerals as the first embodiment to avoid duplicating description.

Figure 6:
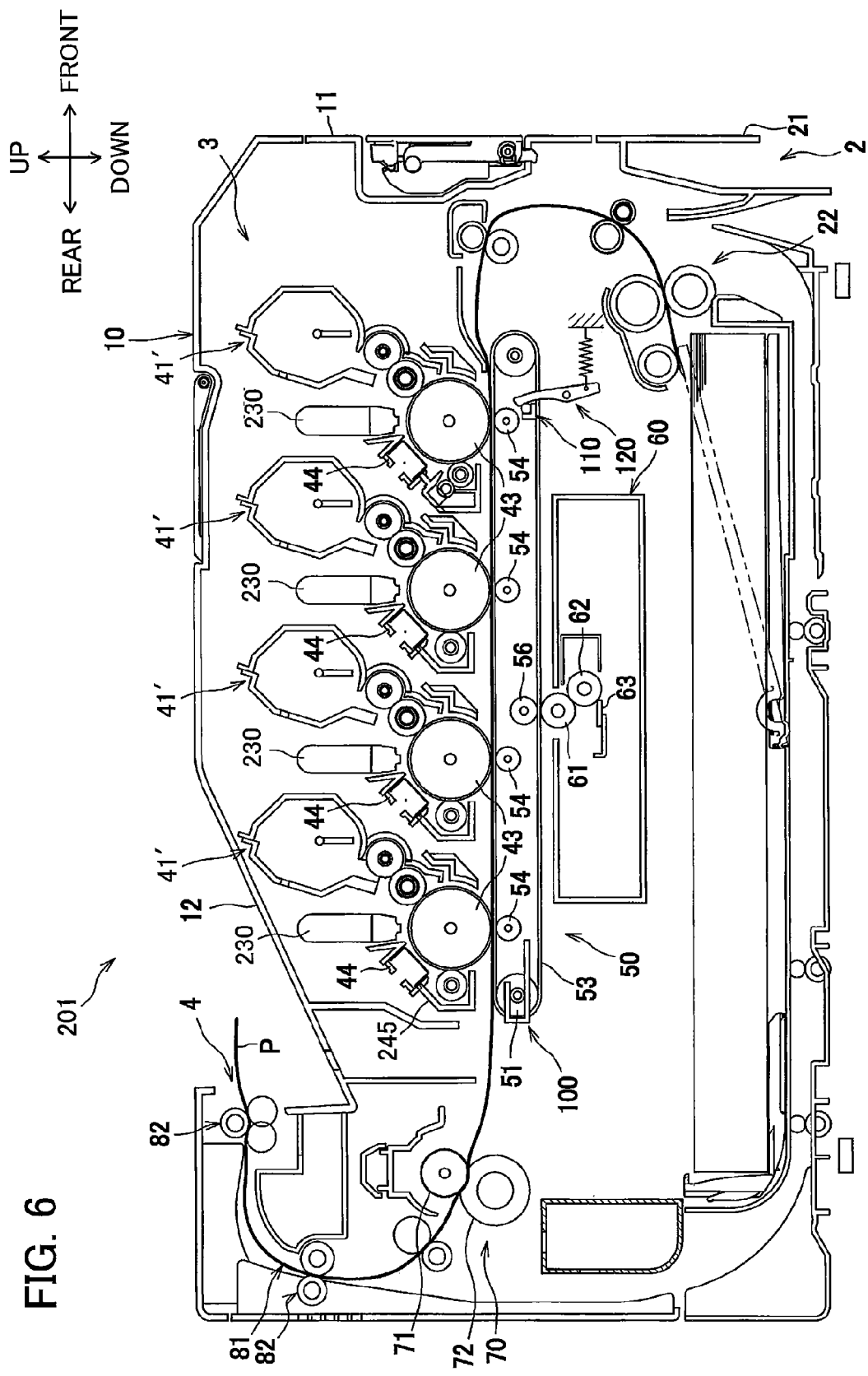
FIG. 6 is a cross-sectional view showing a general construction of a color printer according to a second embodiment.

As shown in FIG. 6, the color printer 201 of the second embodiment is not provided with the retaining member 42 of the first embodiment, but is provided with four LED units 230 instead of the exposure unit 30 of the first embodiment. Each of the LED units 230 has a plurality of LEDs for exposing the corresponding photosensitive drums 43. Further, four supporting frames 245 are provided in the main body 10 for supporting corresponding process units 41'. Each of the process units 41' is detachably mountable in the main body 10, independently.

Figure 7A:
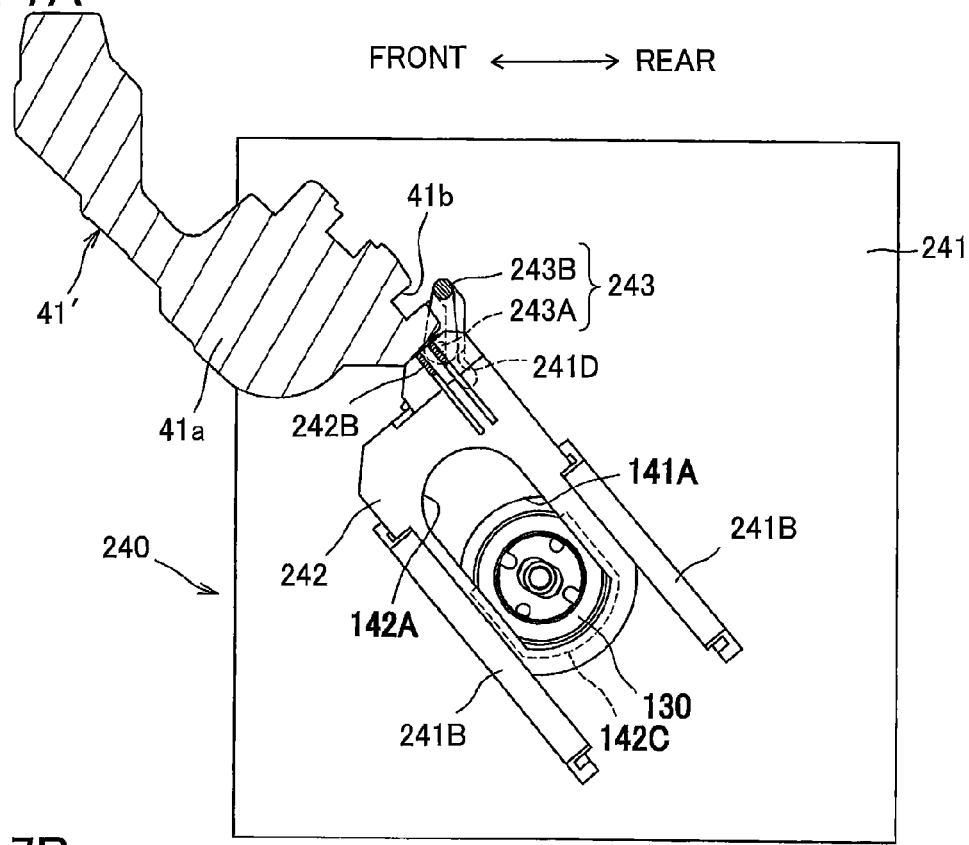
FIG. 7A is an explanatory view illustrating movement of an interlocking mechanism according to the second embodiment, wherein a process unit according to the second embodiment is displaced from its mounted position.
Figure 7B:
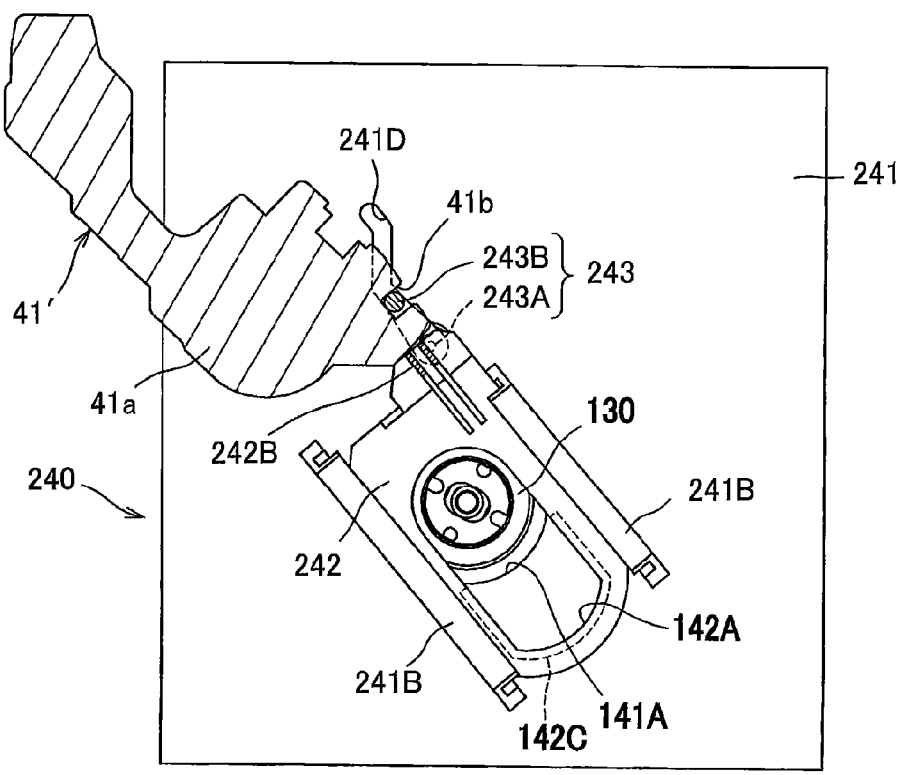
FIG. 7B is an explanatory view illustrating movement of the interlocking mechanism according to the second embodiment, wherein the process unit according to the second embodiment is in its mounted position.

In the second embodiment, the rearmost process unit 41' includes a process frame 41a whose rear end portion is formed with a groove 41b, as shown in FIGS. 7A and 7B.

Further, as shown in FIG. 7A, instead of the interlocking mechanism 140 of the first embodiment, an interlocking mechanism 240 is provided in the main body 10 as another example of the first interlocking mechanism. The interlocking mechanism 240 according to the second embodiment is provided at a position corresponding to the rearmost process unit 41' (and the coupling 130) and is configured to advance and retract the coupling 130 in the left-right direction in conjunction with the operations to mount and remove the rearmost process unit 41' (the rearmost photosensitive drum 43) relative to the main body 10. The structure of the coupling 130 is identical to that of the first embodiment.

Specifically, the interlocking mechanism 240 includes a side frame 241, a sliding member 242, and a pivot member 243. The side frame 241 has a structure approximately equivalent to the side frame 141 of the first embodiment, but is provided with a pair of sliding rails 241B each sloping downward toward the rear. A guiding slot 241D is also formed in the side frame 241 at a position obliquely above and forward of the opening 141A.

As in the first embodiment, the sliding member 242 is configured to slidingly move along the sliding rails 241B in a direction diagonally downward and rearward. The sliding member 242 can move between an upper position (the position shown in FIG. 7A) when the rearmost process unit 41' is in its removed position, and a lower position (the position shown in FIG. 7B) when the rearmost process unit 41' is in its mounted position. Further, the sliding member 242 includes a first contact part 242B configured to contact a bottom portion of the process frame 41a constituting the rearmost process unit 41'.

The pivot member 243 has a rotational shaft 243A provided on an upper end portion of the sliding member 242, and an arm 243B extending upward from the rotational shaft 243A. The arm 243B has a distal end that is engageable with the groove 41b of the process frame 41a. The distal end of the arm 243B is also engaged with the guiding slot 241D. The pivot member 243 is configured to pivot counterclockwise in FIG. 7A while the sliding member 242 moves diagonally downward and rearward. A spring (not shown) urges the pivot member 243 clockwise in FIGS. 7A and 7B.

Next, operations performed on the color printer 201 having the above construction will be described.

To mount the (rearmost) process unit 41' in the main body 10, the user places the process frame 41a in contact with the first contact part 242B and moves the sliding member 242 with the process unit 41' from its upper position to its lower position, as shown in FIG. 7A. As the sliding member 242 moves diagonally downward and rearward, the arm 243B of the pivot member 243 moves along the guiding slot 241D, causing the pivot member 243 to pivot counterclockwise in FIG. 7A against the urging force of the spring (not shown) until the arm 243B becomes engaged in the groove 41b of the process frame 41a, as shown in FIG. 7B. Subsequently, the process unit 41' is placed in its mounted position, while the sliding member 242 is placed in its lower position.

When removing the (rearmost) process unit 41' from the main body 10, the user begins to lift the rearmost process unit 41' diagonally upward and forward from the position shown in FIG. 7B to the position shown in FIG. 7A. At this time, the arm 243B engaged in the groove 41b moves diagonally upward and forward together with the process unit 41', as the sliding member 242 moves from its lower position to its upper position. As the process unit 41' moves upward, the arm 243B pivots clockwise in FIG. 7B along the guiding slot 241D and disengages from the groove 41b, as illustrated in FIG. 7A. Once the rearmost process unit 41' is removed, the sliding member 242 is maintained in its upper position by the urging force of the spring (not shown).

3. Third Embodiment

A interlocking mechanism 350 according to a third embodiment will now be described while referring to FIGS. 8 through 10B, wherein like parts and components are designated by the same reference numerals as the first and second embodiments to avoid duplicating description.

Figure 8:
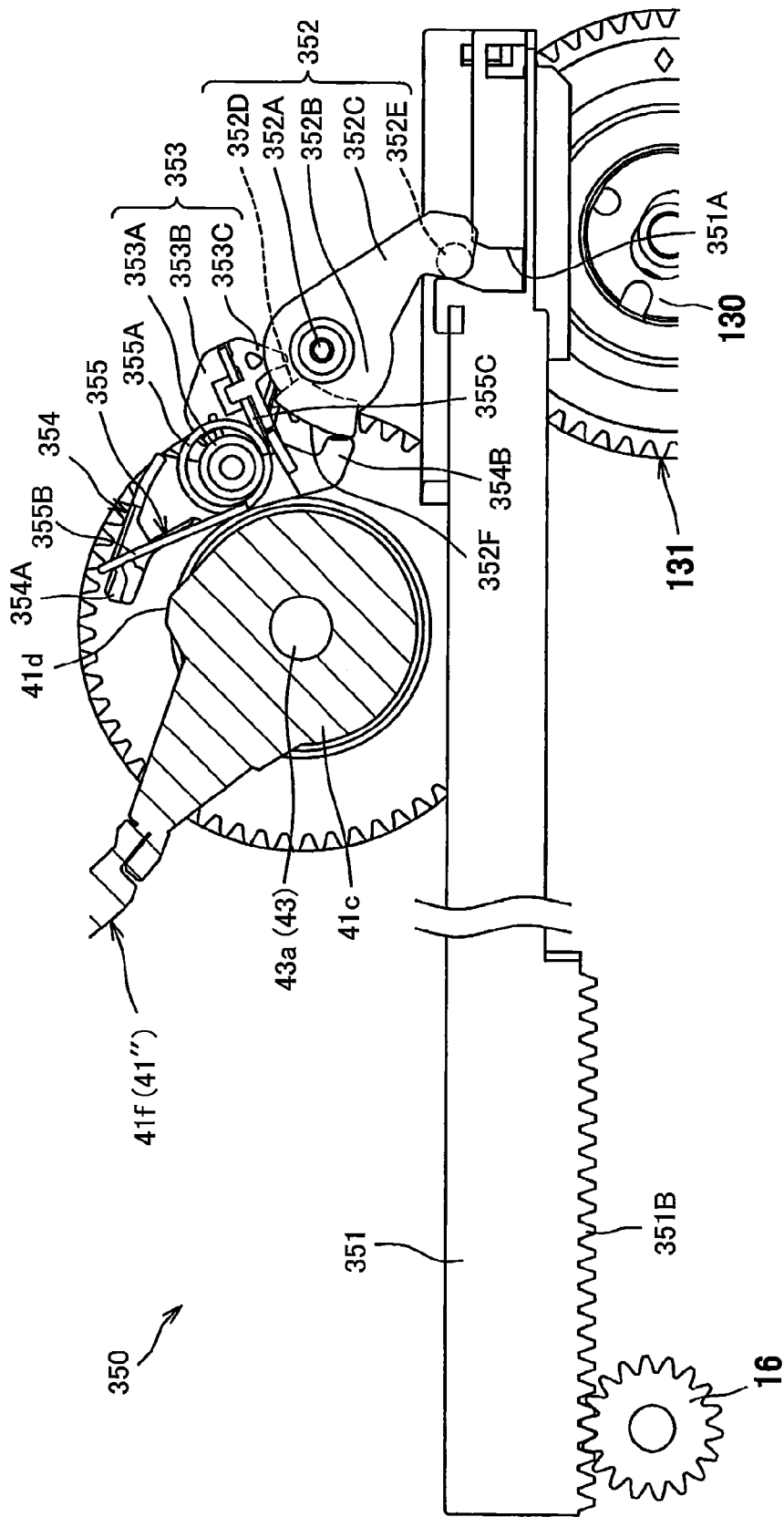
FIG. 8 is an explanatory view illustrating a structure of an interlocking mechanism according to a third embodiment, wherein a process unit according to the third embodiment is in an unlocked state.

In the third embodiment, the color printer 201 of the second embodiment shown in FIG. 6 is provided with the interlocking mechanism 350 shown in FIG. 8 in place of the interlocking mechanism 240 of the second embodiment. The interlocking mechanism 350 is an example of a second interlocking mechanism.

The interlocking mechanism 350 includes a drum locking rod 351, and four sets of a pivot member 352, a spring support member 353, a locking member 354 and a torsion coil spring 355, each set being disposed at a position corresponding to each of the photosensitive drums 43. Hereinafter, descriptions will be made only for the above-identified members constituting the one set corresponding to the rearmost photosensitive drum 43. The components constituting each of the other three sets corresponding to the remaining three photosensitive drums 43 have the same structures as those for the set corresponding to the rearmost photosensitive drum 43, and hence detailed descriptions therefor are omitted.

The drum locking rod 351 is disposed at a position corresponding to the top surface of the conveying belt 53 shown in FIG. 6 and is arranged to extend in the front-rear direction. A groove 351A is formed in a top surface of the drum locking rod 351 at a position corresponding to the photosensitive drum 43. A rack gear 351B is provided along a bottom edge of the drum locking rod 351 at a front end thereof. The rack gear 351B is engaged with a gear 16 (provided on the main body 10) into which a motor (not shown) is configured to input a drive force. By driving the gear 16 to rotate, the drum locking rod 351 can be slidingly moved between a rearward position (the position shown in FIG. 8) and a forward position (the position shown in FIG. 9).

As shown in FIG. 10A, a contact member 351C is provided on the drum locking rod 351 at a position corresponding to the coupling 130 located near a rear end of the drum locking rod 351, so as to be capable of contacting the flange 130C of the coupling 130. The contact member 351C includes a second contact part 351D that slopes leftward toward the front from the rear end of the drum locking rod 351, and a third contact part 351E that extends forward from a front end of the second contact part 351D.

As in the first embodiment, the coupling 130 can move between the retracted position (the position shown in FIG. 10A) retracted from the shaft 51B (not shown) of the drive roller 51, and the contact position (the position shown in FIG. 10B) for contacting the shaft 51B.

When the drum locking rod 351 is in its rearward position, the third contact part 351E is in contact with the flange 130C as shown in FIG. 10A. Hence, the coupling 130 is moved leftward against the urging force of the compressed spring 15 and is in its retracted position.

As shown in FIG. 8, the pivot member 352 is configured to pivot about a pivot shaft 352A supported by the supporting frame 245 (see FIG. 6). The pivot member 352 is arranged at a position corresponding to the groove 351A in the drum locking rod 351. The pivot member 352 includes a body part 352B forming a general circular shape about the pivot shaft 352A, and an arm 352C that extends approximately downward from the body part 352B.

The body part 352B has an upper portion from which a first cam part 352D and a second cam part 352F protrude leftward. An engaging part 352E is provided on a distal end of the arm 352C to protrude leftward therefrom. The engaging part 352E is configured to engage in the groove 351A of the drum locking rod 351.

The spring support member 353 is disposed above the pivot member 352 for supporting the torsion coil spring 355. The spring support member 353 includes a spring retaining part 353A, a spring anchoring part 353B, and a fourth contact part 353C. The spring support member 353 is capable of pivoting about the spring retaining part 353A supported by a side frame or the like constituting the main body 10.

The spring retaining part 353A is formed in a cylindrical shape. The spring anchoring part 353B extends rearward from the spring retaining part 353A. The fourth contact part 353C protrudes downward from the rear end of the spring anchoring part 353B and is configured to abut on the first cam part 352D from the rear side thereof.

The locking member 354 is capable of pivotally moving coaxially with the spring retaining part 353A. The locking member 354 functions to lock a position of a shaft 43a of the photosensitive drum 43. More specifically, the locking member 354 is configured to lock a shaft retaining part 41c provided on a process frame 41f of each process unit 41". The shaft retaining part 41c is configured to hold the shaft 43a of the photosensitive drum 43. The shaft retaining part 41C includes a contact surface 41d that protrudes upward from an upper end of the shaft retaining part 41c. The locking member 354 is configured to restrict displacement of the shaft 43a of the photosensitive drum 43 by locking and unlocking the shaft retaining part 41C. The locking member 354 includes a locking part 354A that extends upward from the spring retaining part 353A, and a fifth contact part 354B that extends downward from the spring retaining part 353A.

The locking part 354A is configured to contact the contact surface 41d of the shaft retaining part 41c. The fifth contact part 354B is positioned to contact the second cam part 352F of the pivot member 352.

The torsion coil spring 355 functions to urge the locking member 354 toward the contact surface 41d on the shaft retaining part 41c. The torsion coil spring 355 includes a coiled part 355A, a first arm 355B, and a second arm 355C.

The coiled part 355A is retained on the spring retaining part 353A. The first arm 355B extends upward from the coiled part 355A and is anchored by the locking part 354A for urging the locking part 354A counterclockwise in FIG. 8. The second arm 355C extends rearward from the coiled part 355A and is anchored by the spring anchoring part 353B for urging the spring anchoring part 353B clockwise in FIG. 8.

Next, the operations performed on the color printer 201 having the interlocking mechanism 350 will be described.

To lock the process unit 41" (the photosensitive drum 43) in position, the gear 16 is rotated to move the drum locking rod 351 from its rearward position toward its forward position, as illustrated in FIG. 8. As the drum locking rod 351 moves forward, the arm 352C engaged in the groove 351A moves forward, causing the pivot member 352 to pivot clockwise in FIG. 8 about the pivot shaft 352A. This pivotal movement causes the first cam part 352D to move rearward to make contact with the fourth contact part 353C of the spring support member 353, as shown in FIG. 9.

Contact from the first cam part 352D pushes the fourth contact part 353C rearward, causing the spring support member 353 to pivot counterclockwise in FIG. 9. Due to the torsion coil spring 355, the locking member 354 also pivots counterclockwise as the spring support member 353 pivots, thereby bringing the locking part 354A into contact with the contact surface 41d on the shaft retaining part 41c to lock the shaft retaining part 41c.

Further, when the drum locking rod 351 begins to move from its rearward position toward its forward position, as illustrated in FIG. 10A, the flange 130C of the coupling 130 moves off the third contact part 351E and gradually moves rightward from its retracted position while sliding on and along the second contact part 351D. When the drum locking rod 351 is moved to its forward position, as illustrated in FIG. 10B, the flange 130C leaves the second contact part 351D and is placed in its contact position.

In other words, the interlocking mechanism 350 engages the coupling 130 with the drive roller 51 by moving the coupling 130 in the left-right direction (rightward) in conjunction with the locking operation of the locking member 354.

To unlock the process unit 41", the gear 16 is rotated such that the drum locking rod 351 moves from its forward position toward its rearward position, as illustrated in FIG. 9. As the drum locking rod 351 moves rearward, the arm 352C engaged in the groove 351A also moves rearward, causing the pivot member 352 to pivot counterclockwise in FIG. 9 about the pivot shaft 352A. This pivotal movement causes the first cam part 352D to move forward so as to separate from the fourth contact part 353C of the spring support member 353, as illustrated in FIG. 8.

When the first cam part 352D no longer contacts the fourth contact part 353C, the second cam part 352F contacts the fifth contact part 354B, causing the spring support member 353 and locking member 354 to pivot clockwise in FIG. 8 so that the locking member 354 separates from the contact surface 41d on the shaft retaining part 41c to realize unlocking of the shaft retaining part 41c from the locking member 354.

Further, when the drum locking rod 351 begins to move from its forward position toward its rearward position, as illustrated in FIG. 10B, the flange 130C of the coupling 130 moves gradually leftward from its contact position while sliding on and along the second contact part 351D. When the drum locking rod 351 moves to its rearward position shown in FIG. 10A, the flange 130C is placed in its retracted position in contact with the third contact part 351E.

Hence, the interlocking mechanism 350 disengages the coupling 130 from the drive roller 51 by moving the coupling 130 in the left-right direction (leftward) in association with the unlocking operation of the locking member 354.

4. Variations and Modifications

In the embodiments described above, the conveying belt 53 is mounted over the drive roller 51 and follow roller 52 in a tensioned state, but the conveying belt 53 may be placed in a tensioned state by the drive roller 51 and two or more follow rollers. Further, instead of the conveying belt 53 for conveying sheets P, a transfer belt or a photosensitive belt for carrying toner images and transferring the images onto paper may be used as an example of the belt.

Various modifications can be made to the first restricting member 100 and second restricting members 110 of the depicted embodiments.

Figure 11A:
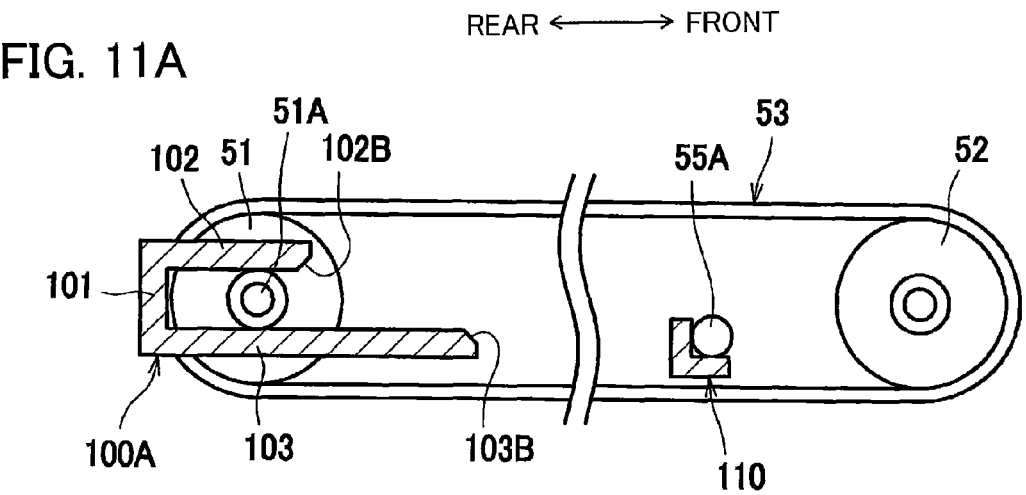
FIG. 11A is a schematic view showing structures of a first restricting member and a second restricting member according to a first modification of the first embodiment.

FIG. 11A shows a first restricting member 100A according to a first modification. In the first restricting member 100A, both of the upper part 102 and lower part 103 have tapered distal ends. More specifically, the upper part 102 has a sloped surface 102B that slopes upward toward the front from the front edge of the bottom surface 102A. The lower part 103 has a sloped surface 103B that slopes downward toward the front from the front edge of the top surface 103A.

This structure would facilitate insertion of the bearing 51A into the gap between the upper part 102 and lower part 103.

Figure 11B:
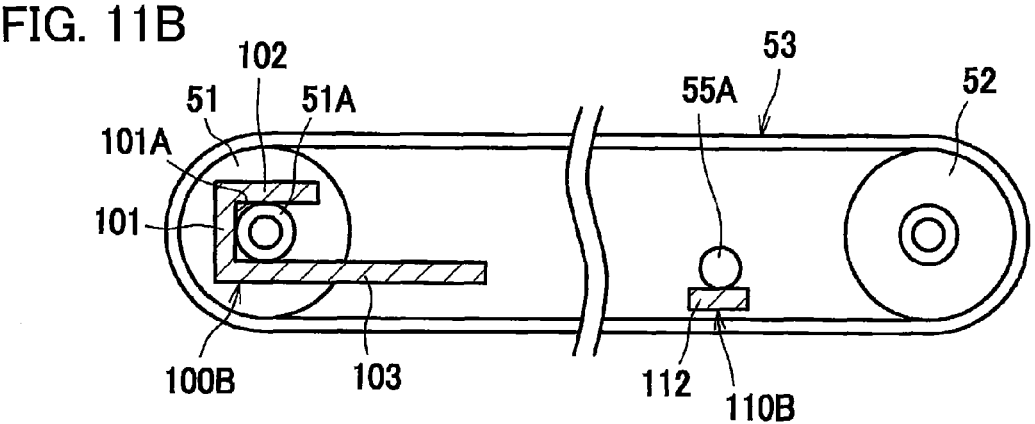
FIG. 11B is a schematic view showing structures of a first restricting member and a second restricting member according to a second modification of the first embodiment.

FIG. 11B shows a first restricting member 100B according to a second modification. In the first restricting member 100B, the base part 101 has a front surface 101A that serves as the second restricting part, instead of the rear restricting part 111 of the second restricting member 110 of the depicted embodiments. Further, In this case, a second restricting member 110B having no rear restricting part is provided in place of the second restricting member 110. Thus, the second restricting member 110B of the second modification only includes the bottom restricting part 112. In this case, the bearings 51A of the drive roller 51 serve as the first restricted part and the second restricted part.

Figure 11C:
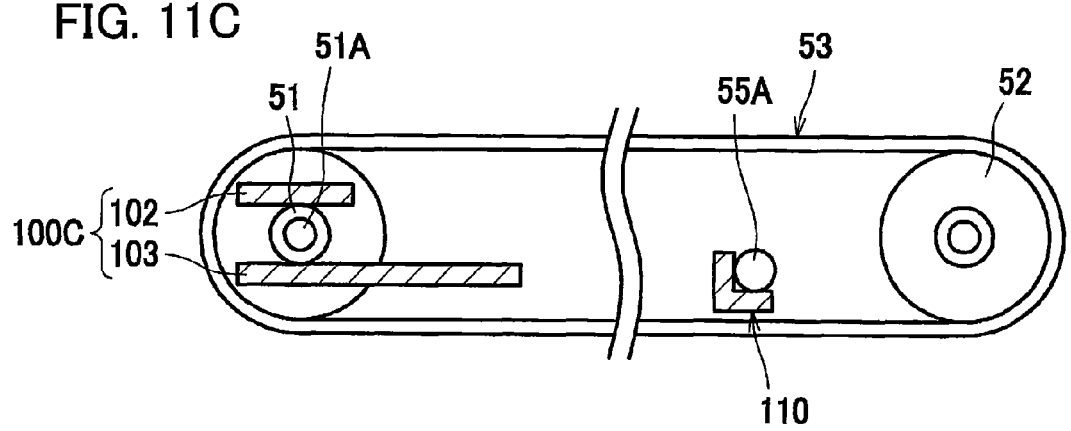
FIG. 11C is a schematic view showing structures of a first restricting member and a second restricting member according to a third modification of the first embodiment.

FIG. 11C shows a first restricting member 100C according to a third modification. In place of the first restricting member 100 of the depicted embodiments that is open only on the front end thereof, the first restricting member 100C of the third modification is open on both front and rear ends thereof.

In the embodiments described above, only one first restricting member 100 is provided on the left side (coupling 130 side) of the drive roller 51. However, instead of the one first restricting member 100, one pair of first restricting members 100 may be provided to interpose the drive roller 51 therebetween in the left-right direction for further improved positioning of the belt unit 50 relative to the main body 10.

In the embodiments described above, the second restricting members 110 are disposed at positions corresponding to the pins 55A of the frame 55 constituting the belt unit 50, but the second restricting members 110 may be disposed at positions corresponding to the follow roller 52 instead. In this case, the second restricting members may be configured to restrict the positions of the bearings 52A of the follow roller 52.

Further, while pressing members 120 are provided in the embodiments described above, these components may be omitted.

While the interlocking mechanisms 140, 240, 350 are provided in the he first to third embodiments described above, these components may be omitted.

While the color printer 1 is exemplified as an example of the disclosure in the embodiments, the disclosure may be applied to another type of image-forming apparatus, such as a copying machine or a multifunction peripheral.

While the description has been made in detail with reference to specific embodiments thereof, it would be apparent to those skilled in the art that various changes and modifications may be made therein without departing from the scope of the above described embodiments.

What is claimed is:

1. An image-forming apparatus comprising:
a main body;
a belt unit attachable to the main body, the belt unit comprising:
   a belt;
   a first roller defining an axis extending in an axial direction and configured to rotate about the axis; and
   a second roller opposing the first roller in a first direction perpendicular to the axial direction, the belt being looped over the first roller and the second roller and extending in the first direction;
a coupling configured to move in the axial direction to come into engagement with the first roller for inputting a drive force into the first roller;
a first restricting part provided on the main body and configured to restrict the first roller from moving in a second direction perpendicular to the axial direction and the first direction when the belt unit is attached to the main body;
a second restricting part provided on the main body and configured to restrict the belt unit from moving in the first direction; and
a second restricted part provided on the belt unit and configured to abut on the second restricting part when the belt unit is attached to the main body.

2. The image-forming apparatus as claimed in claim 1, wherein the first restricting part comprises a pair of restricting surfaces positioned to interpose the axis of the first roller therebetween.

3. The image-forming apparatus as claimed in claim 1, wherein the belt unit includes a first restricted part configured to be restricted by the first restricting part, the first restricted part having a cylindrical surface configured to contact the first restricting part.

4. The image-forming apparatus as claimed in claim 3, wherein the cylindrical surface defines an axial center that is coincident with the axis of the first roller.

5. The image-forming apparatus as claimed in claim 1, wherein the first restricting part has end portions in the first direction, at least one of the end portions being open.

6. The image-forming apparatus as claimed in claim 1, further comprising a first pressing member provided on the main body and configured to press the second restricted part toward the second restricting part.

7. The image-forming apparatus as claimed in claim 1, wherein the second restricting part is positioned to be spaced away from the first restricting part in the first direction, the second restricting part being positioned closer to the second roller than the first restricting part is to the second roller in the first direction.

8. The image-forming apparatus as claimed in claim 7, further comprises:
a third restricting part configured to restrict the belt unit from moving in the second direction, the third restricting part being formed with the second restricting part; and
a third restricted part provided on the belt unit and configured to abut on the third restricting part when the belt unit is attached to the main body.

9. The image-forming apparatus as claimed in claim 1, wherein the second restricting part is provided on the first restricting part, the second restricting part being a surface extending in the second direction; and
wherein the second restricted part is a bearing provided on the first roller.

10. The image-forming apparatus as claimed in claim 9, further comprises:
a third restricting part provided on the main body and configured to restrict the belt unit from moving in the second direction, the third restricting part opposing the first restricting part in the first direction and being positioned closer to the second roller than the first restricting part is to the second roller in the first direction; and
a third restricted part provided on the belt unit and configured to abut on the third restricting part when the belt unit is attached to the main body.

11. The image-forming apparatus as claimed in claim 1, further comprising:
a photosensitive member configured to be mounted in and removed from the main body, the photosensitive member mounted in the main body being configured to make contact with the belt of the belt unit attached to the main body; and
a first interlocking mechanism provided on the main body and configured to move the coupling in the axial direction to bring the coupling into engagement with the first roller of the belt unit attached to the main body in conjunction with mounting of the photosensitive member in the main body.

12. The image-forming apparatus as claimed in claim 11, wherein the first interlocking mechanism is further configured to move the coupling in the axial direction to cause the coupling to disengage from the first roller of the belt unit attached to the main body in conjunction with removal of the photosensitive member from the main body.

13. The image-forming apparatus as claimed in claim 11, further comprising a retaining member configured to retain the photosensitive member, the retaining member being configured to move between a mounted position mounted in the main body and a removed position displaced from the mounted position,
wherein the first interlocking mechanism is configured to move the coupling in the axial direction in conjunction with movement of the retaining member between the mounted position and the removed position.

14. An image-forming apparatus comprising:
a main body;
a belt unit attachable to the main body, the belt unit comprising:
a belt;
a first roller defining an axis extending in an axial direction and configured to rotate about the axis; and
a second roller opposing the first roller in a first direction perpendicular to the axial direction, the belt being looped over the first roller and the second roller and extending in the first direction;
a coupling configured to move in the axial direction to come into engagement with the first roller for inputting a drive force into the first roller;
a first restricting part provided on the main body and configured to restrict the first roller from moving in a second direction perpendicular to the axial direction and the first direction when the belt unit is attached to the main body;
a third restricting part provided on the main body and configured to restrict the belt unit from moving in the second direction, the third restricting part opposing the first restricting part in the first direction and being positioned closer to the second roller than the first restricting part is to the second roller in the first direction; and
a third restricted part provided on the belt unit and configured to abut on the third restricting part when the belt unit is attached to the main body.

15. The image-forming apparatus as claimed in claim 14, further comprising a second pressing member provided on the main body and configured to press the third restricted part toward the third restricting part, the second pressing member being positioned closer to the second roller than to the first roller when the belt unit is attached to the main body.

16. The image-forming apparatus as claimed in claim 14, further comprising:
a photosensitive member configured to be mounted in and removed from the main body, the photosensitive member mounted in the main body being configured to make contact with the belt of the belt unit attached to the main body; and
a first interlocking mechanism provided on the main body and configured to move the coupling in the axial direction to bring the coupling into engagement with the first roller of the belt unit attached to the main body in conjunction with mounting of the photosensitive member in the main body.

17. The image-forming apparatus as claimed in claim 16, wherein the first interlocking mechanism is further configured to move the coupling in the axial direction to cause the coupling to disengage from the first roller of the belt unit attached to the main body in conjunction with removal of the photosensitive member from the main body.

18. The image-forming apparatus as claimed in claim 16, further comprising a retaining member configured to retain the photosensitive member, the retaining member being configured to move between a mounted position mounted in the main body and a removed position displaced from the mounted position,
wherein the first interlocking mechanism is configured to move the coupling in the axial direction in conjunction with movement of the retaining member between the mounted position and the removed position.

19. An image-forming apparatus comprising:
a main body;
a belt unit attachable to the main body, the belt unit comprising:
a belt;
a first roller defining an axis extending in an axial direction and configured to rotate about the axis; and
a second roller opposing the first roller in a first direction perpendicular to the axial direction, the belt being looped over the first roller and the second roller and extending in the first direction;
a coupling configured to move in the axial direction to come into engagement with the first roller for inputting a drive force into the first roller;
a first restricting part provided on the main body and configured to restrict the first roller from moving in a second direction perpendicular to the axial direction and the first direction when the belt unit is attached to the main body;
a photosensitive member configured to be mounted in and removed from the main body, the photosensitive member mounted in the main body being configured to make contact with the belt of the belt unit attached to the main body, the photosensitive member having a rotational shaft;
a locking member configured to lock and unlock a position of the rotational shaft; and
a second interlocking mechanism provided on the main body and configured to move the coupling in the axial direction to bring the coupling into engagement with the first roller of the belt unit attached to the main body in conjunction with locking of the locking member over the rotational shaft of the photosensitive member mounted in the main body.

20. The image-forming apparatus as claimed in claim 19, wherein the second interlocking mechanism is further configured to move the coupling in the axial direction to cause the coupling to disengage from the first roller of the belt unit attached to the main body in conjunction with unlocking of the locking member over the rotational shaft of the photosensitive member mounted in the main body.

* * * * *